US006667363B2

(12) United States Patent
Mizushiro et al.

(10) Patent No.: US 6,667,363 B2
(45) Date of Patent: Dec. 23, 2003

(54) MATERIALS FOR LIQUID KEEPING CONTAINERS

(75) Inventors: Ken Mizushiro, Tokyo (JP);
Shigekatsu Yoshida, Kanagawa (JP);
Hideo Kinoshita, Kanagawa (JP);
Toshiro Ijima, Saitama (JP)

(73) Assignees: Asahi Kasei Kabushiki Kaisha (JP);
Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/802,766

(22) Filed: Mar. 9, 2001

(65) Prior Publication Data

US 2002/0050584 A1 May 2, 2002

Related U.S. Application Data

(63) Continuation of application No. PCT/JP99/04864, filed on Sep. 8, 1999.

(30) Foreign Application Priority Data

Sep. 9, 1998 (JP) .......................................... 10-255707
Apr. 23, 1999 (JP) .......................................... 11-116095

(51) Int. Cl.[7] .............................................. C08L 53/02
(52) U.S. Cl. .......................... 524/494; 525/99; 525/70; 525/71

(58) Field of Search .................................. 524/494, 504, 524/505, 576, 577, 578, 579, 582; 525/70, 71, 98, 99

(56) References Cited

U.S. PATENT DOCUMENTS

| 5,391,626 A | * | 2/1995 | Machida et al. ............. 525/242 |
| 5,418,290 A | * | 5/1995 | Machida et al. ............... 525/88 |
| 5,460,818 A | * | 10/1995 | Park et al. ................... 426/415 |
| 5,902,850 A | * | 5/1999 | Chino et al. .................. 524/494 |
| 6,013,723 A | * | 1/2000 | Akao .......................... 524/577 |
| 6,096,829 A | * | 8/2000 | Chino et al. ................... 525/99 |

FOREIGN PATENT DOCUMENTS

| EP | 0-324-398 B1 | 9/1993 |
| JP | A-7-157613 | 6/1995 |
| JP | A-8-104785 | 4/1996 |
| JP | A-9-132686 | 5/1997 |
| WO | WO97/32928 | 9/1997 |

* cited by examiner

Primary Examiner—Edward J. Cain
Assistant Examiner—Katarzyna I Wyrozebski Lee
(74) Attorney, Agent, or Firm—Dickstein, Shapiro, Morin & Oshinsky, L.L.P.

(57) ABSTRACT

A material for liquid keeping containers comprising a resin composition which contains a syndiotactic polystyrene resin and a polypropylene resin and includes a compatibilized structure of the syndiotactic polystyrene resin phase and the polypropylene resin phase, the proportion of these phases being 90-10/10-90 (weight ratio).

15 Claims, 2 Drawing Sheets

MATERIALS FOR LIQUID KEEPING CONTAINERS

This application is a continuation of PCT International application PCT/JP99/04864 filed Sep. 8, 1999.

TECHNICAL FIELD

The present invention relates to a material for liquid keeping containers which is excellent in impact resistance, chemical resistance and water vapor transmission resistance and suitable for molding liquid keeping containers such as automobile parts of anti-freezing system, such as radiator tanks, and battery cases for secondary batteries, and to a liquid keeping container comprising a molded product of the material.

BACKGROUND ART

At present, thermoplastic resins are used for radiator tanks which are automobile parts, taking into consideration their lightness and easiness in processability. For using thermoplastic resins for radiator tanks, they are required to have performances such as impact resistance, chemical resistance and water vapor transmission resistance. For example, coolant used for cooling engines is circulated at about 100° C. at steady state, but the temperature thereof rises instantaneously to about 130° C. when the engine is stopped. Therefore, thermoplastic resins used for radiator tanks must have not only chemical resistance to stand the coolant at high temperatures, but also water vapor transmission resistance to prevent decrease of the amount of coolant caused by volatilization of water contained in the coolant. Furthermore, they are needed to have impact resistance for improving safety against breakage caused by shock. The materials used at present are polyamide resins, which are usually reinforced with glass fibers (GF). The GF-reinforced polyamide resins are superior in heat resistance and water vapor transmission resistance, but have the defect that they undergo hydrolysis with coolant liquid of high temperatures to result in deterioration of strength. Moreover, with recent progress in performance of engines, the coolant tends to be further heated, and the conventional polyamide resins do not meet the requirement, and materials having long-term stability to be substituted for the polyamide resins have been demanded.

Moreover, with recent spread of portable telephones, personal computers, video cameras and electric cars, rechargeable secondary batteries are noticed. In order to use the resins for battery cases as containers for the batteries, they are also required to have performances such as impact resistance and chemical resistance. That is, they are needed to have the chemical resistance for preventing damage on the peripheral devices caused by leakage of organic electrolyte used and the impact resistance for improving safety against breakage caused by shock. Furthermore, water vapor transmission resistance is also needed depending on the kind of the secondary batteries.

There are various resin materials, but, at present, no materials are known which satisfy all of the performances such as water vapor transmission resistance, heat resistance, impact resistance and chemical resistance suitable for the above uses.

DISCLOSURE OF INVENTION

The objects of the present invention is to provide a material which is excellent in water vapor transmission resistance, chemical resistance, heat resistance and mechanical strength and suitable for liquid keeping containers, e.g., automobile parts of anti-freezing system such as radiator tanks and battery cases for secondary batteries, and to provide a liquid keeping container comprising a molded products of said material.

As a result of research conducted by the inventors in an attempt to solve the above problems, it has been found that a resin blend composition which contains a syndiotactic polystyrene resin excellent in heat resistance and markedly excellent in chemical resistance and a polypropylene resin and has a two-phase structure comprising a polypropylene resin phase and a syndiotactic polystyrene resin phase is excellent in water vapor barrier properties, good in heat resistance and chemical resistance and excellent in mechanical strengths such as impact resistance and shows substantially no deterioration in properties even when it is dipped in a special liquid such as an anti-freezing solution mainly composed of ethylene glycol at a high temperature for a long time, and, therefore, is most suitable as a material for liquid keeping containers such as automobile parts of anti-freeze system which are required to have water vapor transmission resistance, heat resistance, chemical resistance and impact resistance. Thus, the present invention has been accomplished.

That is, the present invention relates to a material for liquid keeping containers which comprises a resin composition containing a syndiotactic polystyrene resin and a polypropylene resin and also having a compatibilized structure of a syndiotactic polystyrene resin phase and a polypropylene resin phase, the proportion of these phases being 90-10/10-90 (weight ratio), and further relates to a liquid keeping container comprising a molded product of said material.

The present invention further relates to a material for liquid keeping containers which is excellent in mechanical strength and which contains a thermoplastic elastomer, a polyphenylene ether resin and/or an inorganic filler in addition to the above composition, and further relates to a liquid keeping container comprising a molded product of said material.

BEST MODE FOR CARRYING OUT THE INVENTION

Figure 1A:
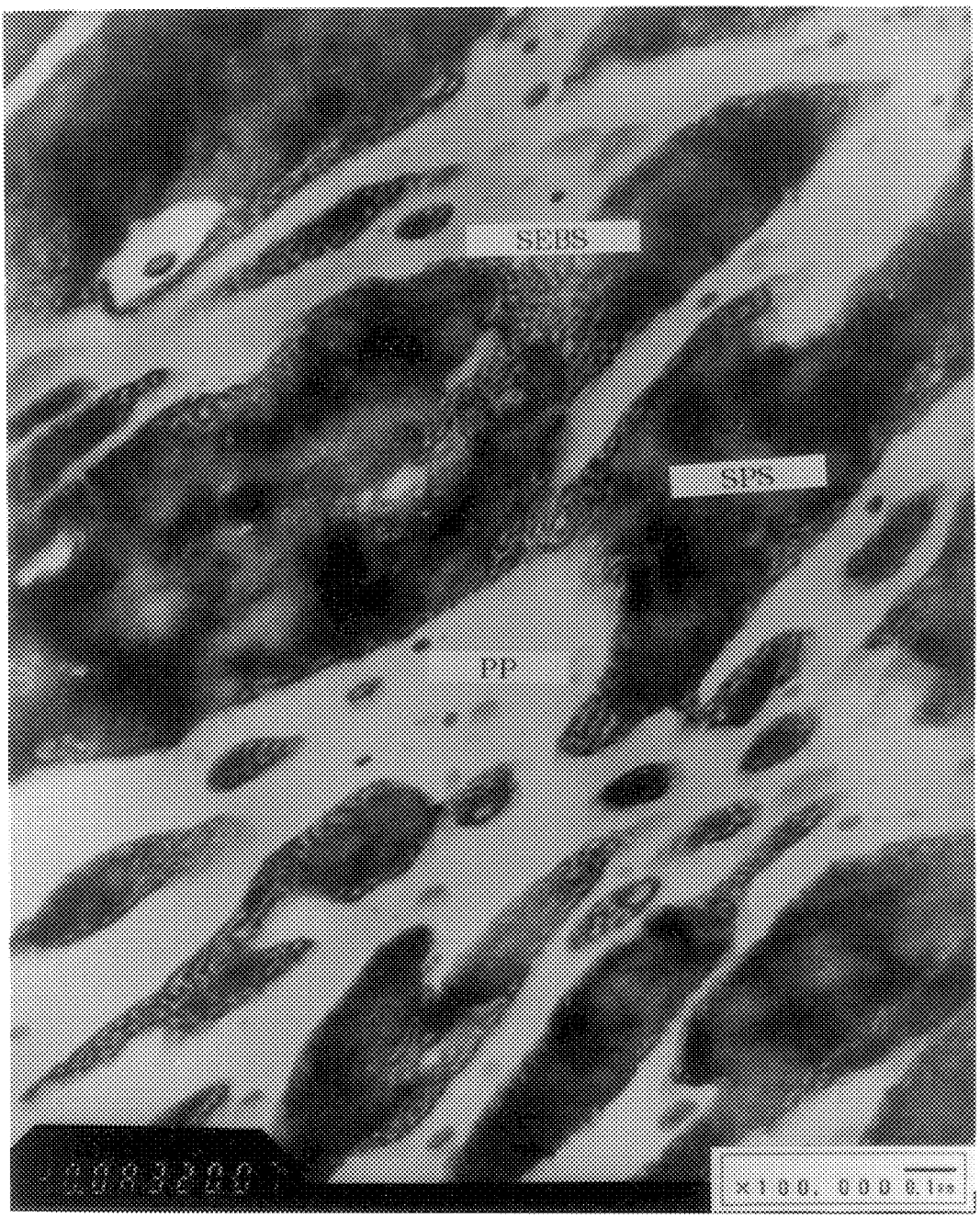
FIGS. 1A and 1B are electron micrographs showing morphology of a molded product comprising the material for liquid keeping containers according to the present invention (FIG. 1A: 100,000 magnifications, FIG. 1B: 25,000 magnifications).

When the liquid keeping containers of the present invention are automobile parts of anti-freeze system such as radiator tanks, not only the resistance to anti-freezing solution mainly composed of ethylene glycol is required, but also mechanical strengths (impact resistance, rigidity, etc.) and chemical resistance to calcium chloride as anti-freezing agents for road are required. The materials for liquid keeping containers and the liquid keeping containers comprising molded products of the materials according to the present invention satisfy these requirements, too.

The automobile part of anti-freeze system which is one of the liquid keeping containers of the present invention is an automobile part through which cooling water flows. Examples of this automobile part are radiator tank, water pump housing, water pump impeller, water valve, radiator pipe, and heater tank. Among them, especially, the radiator tank and the radiator pipe are required to have water vapor transmission resistance, chemical resistance, heat resistance and impact strength because anti-freezing solutions of high temperature are used in these parts. Application of the materials for liquid keeping containers of the present invention to these automobile parts is especially preferred since the above-mentioned characteristics of the materials can be efficiently utilized.

The syndiotactic polystyrene resin used in the present invention is a polystyrene resin having a syndiotactic structure. Being different from atactic polystyrenes produced by usual radical polymerization, they are crystalline polymers produced using catalysts of titanium compounds and alkylaluminoxan and have a melting point of about 270° C. The syndiotactic structure means a steric structure in which phenyl groups as side chains are alternately located above and below a polymer main chain composed of carbon-carbon linkages. The tacticity is determined by NMR, and is shown, for example, by diad, triad and pentad for two, three and five continuing constitutive units in the case of a plurality of continuing constituent units. In the present invention, the syndiotactic polystyrene is preferably a polystyrene of not less than 75% for diad and not less than 30% for pentad. Molecular weight of the syndiotactic polystyrene used in the present invention is preferably 100,000–1,000,000, more preferably 150,000–400,000 in terms of weight-average molecular weight.

The polypropylene resins used in the present invention are crystalline olefin polymers and usually produced using titanium-based catalysts and alkylaluminum promoters.

The polypropylene resins used in the present invention may be homopolymers of propylene or block or random copolymers of propylene and ethylene or combinations of them. Moreover, they may be combinations of homopolymers and copolymers. In the case of the liquid keeping containers of the present invention being radiator tanks, they are used at high temperatures, and, therefore, when they are used for such automobile parts, heat resistance is required and polypropylene used in this case is preferably a highly crystalline polypropylene.

The material for liquid keeping containers of the present invention comprises a resin composition containing at least a syndiotactic polystyrene resin and a polypropylene resin, and the resin composition contains a compatibilized structure of the polypropylene resin phase and the syndiotactic polystyrene resin phase.

The term "compatibilization" or "compatibilized structure" in the present invention means that the syndiotactic polystyrene resin phase and the polypropylene resin phase do not separate at their interface and show satisfactory adhesion therebetween, for example, with a material having affinity for both the resins (compatibilizing agent) which is interposed between them or means such a structure.

When the material for liquid keeping containers is used at high temperatures, for example, as radiator tanks and is required to have a high water vapor transmission resistance, it is preferred that the polypropylene resin is a continuous phase and the syndiotactic polystyrene resin is a disperse phase. Furthermore, when the material for liquid keeping containers is required to have a high chemical resistance, it is preferred that the polypropylene resin is a disperse phase and the syndiotactic polystyrene resin is a continuous phase. If the polypropylene resin is a continuous phase and the syndiotactic polystyrene resin is a disperse phase, the water vapor transmission resistance against anti-freezing solution is improved, and, hence, the material for liquid keeping containers of the present invention is especially preferred to be used for radiator tanks and others which are used at high temperatures.

The thermoplastic elastomers usable in the present invention include styrene thermoplastic elastomers and olefin thermoplastic elastomers.

Examples of the styrene thermoplastic elastomers are block copolymers comprising aromatic vinyl monomer units and conjugated diene monomer units or these block copolymers in which the conjugated diene monomer unit portion is partially or completely hydrogenated. Examples of the conjugated diene monomers constituting the block copolymers are 1,3-butadiene and isoprene. The block structure of the block copolymers includes a linear block copolymer shown by SB, $S(BS)_n$ (n is an integer of 1–3) or $S(BSB)_m$ (m is an integer of 1–2) and a star block copolymer shown by $(SB)_pX$ (p is an integer of 3–6 and X is a residue of a coupling agent such as silicon tetrachloride, tin tetrachloride or a polyepoxy compound) in which the B portion is a bonding center, with a proviso that the polymer block comprising aromatic vinyl monomer unit is expressed by S and the polymer block comprising conjugated diene and/or the conjugated diene partially or completely hydrogenated is expressed by B. Among them, preferred are linear block copolymers of binary type of SB, ternary type of SBS and quaternary type of SBSB. The radiator tank which is one of the uses of the liquid keeping containers of the present invention can be used outdoors and, hence, is required to have weathering resistance. If butadiene or isoprene is present as a rubber component, the molecular weight decreases and the strength is also deteriorated due to oxidative degradation. On the other hand, a hydrogenated block copolymer of an aromatic vinyl monomer unit/a diene monomer unit whose diene component is hydrogenated is superior in weathering resistance, and unexpectedly has an effect to improve impact resistance, and this is particularly preferred. Many of commercially available hydrogenated block copolymers of aromatic vinyl monomer unit/diene monomer unit have a number-average molecular weight of not more than 100,000 and a content of the aromatic vinyl monomer of about 30%. Although these materials are high in the effect to improve impact resistance, when those having a number-average molecular weight of 100,000 or more, for example, 200,000 or more or those having a content of the aromatic vinyl monomer unit of 40% or more, for example, 60% or more, are used each alone or in combination, the impact resistance conspicuously increases. Therefore, when hydrogenated block copolymers of aromatic vinyl monomer unit/conjugated diene monomer unit are used as the materials for liquid keeping containers of the present invention, it is preferred that the copolymers have a content of the aromatic vinyl monomer unit of 40–80% and/or a number-average molecular weight of 100,000–300,000. If the content of the aromatic vinyl monomer unit is less than 40%, remarkable effect to improve impact resistance is not exhibited. If the content of the aromatic vinyl monomer unit exceeds 80%, rubber elasticity decreases and the effect to improve impact resistance tends to lower. If the number-average molecular weight is less than 100,000, no conspicuous effect to improve impact resistance is exhibited. If the number-average molecular weight exceeds 300,000, there is also no conspicuous effect to improve impact resistance.

The olefin thermoplastic elastomers are not limited as far as they exhibit rubber elasticity mainly by copolymerizing ethylene monomers with monomers other than ethylene. Examples of the monomers other than ethylene which are to be copolymerized are α-olefins, vinyl acetate (VA) and ethyl acrylate (EA). As the α-olefins, mention may be made of, for example, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosane, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-tetradecene and combinations of two or more of them. There may be used further olefin thermoplastic elastomers comprising, in addition to these ethylene monomer and α-olefin monomers, non-conjugated diene monomers such as cyclopentadiene, 1,4-hexadiene, cyclooctadiene, methylene norbornene, and ethylidene norbornene. Among them, copolymers of ethylene monomer and α-olefin monomers of 4–10 carbon atoms, especially, copolymers of ethylene monomer and propylene, 1-butene, 1-hexene, 1-octene and/or 1-decene monomers which have a weight ratio of ethylene monomer/α-olefin monomer of 90/10–50/50, preferably 80/20–60/40, are high in rubber elasticity, are industrially easily available, contain no double bond and are excellent in weathering resistance, and thus they are preferred.

As mentioned above, the thermoplastic elastomers usable for the materials of liquid keeping containers of the present invention include styrene thermoplastic elastomers or olefin thermoplastic elastomers, and they all have the effect to improve impact resistance. Among them, styrene thermoplastic elastomers, particularly, hydrogenated styrene thermoplastic elastomers are preferred. This is because these thermoplastic elastomers are high in weathering resistance and, furthermore, they have actions of not only improving impact resistance of the materials for liquid keeping containers, but also improving miscibility of the syndiotactic polystyrene resin and polypropylene resin. That is, the hydrogenated conjugated diene block structure has the action to compatibilize with the propylene structure and, furthermore, the styrene block is compatibilized with the syndiotactic polystyrene by using them in combination with polyphenylene ether referred to hereafter. In this case, when the olefin thermoplastic elastomers are used in combination with the hydrogenated styrene thermoplastic elastomers, the impact resistance of the materials for liquid keeping containers of the present invention can be further improved.

Polyphenylene ether resins (PPE) usable in the present invention are homopolymers and/or copolymers comprising the bond units represented by the following formula:

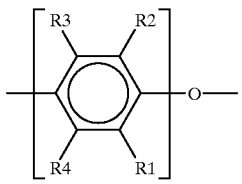

In the above formula, R1, R2, R3 and R4 are selected from the group consisting of hydrogen or substitution hydrocarbon groups of 1–10 carbon atoms, such as methyl group, ethyl group, phenyl group and methylphenyl group and they may be the same as or different from one another. The most preferred example of the substitution hydrocarbon groups is methyl group. This is because the materials are easily available from market. The preferred examples of the polyphenylene ether resins are poly(2,6-dimethyl-1,4-phenylene ether) and a copolymer of 2,6-dimethylphenol and 2,3,6-trimethylphenol. Reduced viscosity (0.5 g/dl, chloroform solution, 30° C.) of the polyphenylene ether resins is preferably in the range of 0.3–0.7 dl/g. The polyphenylene ether resins can be easily produced, for example, by carrying out the polymerization using a complex of cuprous salt and amine as a catalyst in accordance with the method disclosed in U.S. Pat. No. 3,306,874.

Remarkable improvement of properties can be attained by the addition of the polyphenylene ether resin in a small amount to a blend of the crystalline syndiotactic polystyrene resin, the polypropylene resin and the thermoplastic elastomer, especially, the hydrogenated styrene thermoplastic elastomer. It is considered that this is because the blend of the crystalline syndiotactic polystyrene resin, the polypropylene resin and the hydrogenated styrene thermoplastic elastomer is insufficient in compatibility and excellent mechanical strength cannot necessarily be obtained while the polyphenylene ether resin acts as a compatibilizing agent for them and a sharp increase of impact resistance can be attained.

Amount of the polypropylene resin is 10–90% by weight, preferably 20–80% by weight based on 100 parts by weight of the total amount of the syndiotactic polystyrene resin and the polypropylene resin in the material for liquid keeping containers of the present invention. If the amount is less than 10% by weight, water vapor transmission resistance tends to deteriorate. If it exceeds 90% by weight, rigidity and heat resistance are insufficient. Amount of the syndiotactic polystyrene resin is 90–10% by weight, preferably 80–20% by weight. If the amount exceeds 90% by weight, water vapor transmission resistance tends to deteriorate. If it is less than 10% by weight, rigidity and heat resistance are insufficient.

When the material for liquid keeping containers contains the thermoplastic elastomer, content thereof is 1–200 parts by weight, more preferably 5–100 parts by weight, further preferably 10–100 parts by weight based on 100 parts by weight of the content of the syndiotactic polystyrene. If the content is less than 1 part by weight, the effect to improve the impact resistance by the addition of the thermoplastic elastomer is poor, and if it exceeds 200 parts by weight, the material is too large in rubber elasticity and lacks tensile strength.

When the material for liquid keeping containers contains the polyphenylene ether resin, content thereof is 1–200 parts by weight, more preferably 5–100 parts by weight, further preferably 10–100 parts by weight based on 100 parts by weight of the content of the syndiotactic polystyrene. If the content is less than 1 part by weight, the effect to improve the impact resistance by the addition of the polyphenylene ether resin is small, and with increase of the content, the impact resistance increases, but it if is too large, the impact resistance rather decreases. If it exceeds 200 parts by weight, the effect of improving the impact resistance is small.

The most preferred composition used in the present invention is one which contains the syndiotactic polystyrene resin and the polypropylene resin, and, furthermore, the thermoplastic elastomer, especially preferably hydrogenated styrene thermoplastic elastomer, and the polyphenylene ether resin. The material for liquid keeping containers which contains at least these four components is excellent in water vapor transmission resistance, chemical resistance, heat resistance and mechanical strength. In this case, too, the content of the thermoplastic elastomer in the material for liquid keeping containers is 1–200 parts by weight, more preferably 5–100 parts by weight, further preferably 10–100 parts by weight based on 100 parts by weight of the content of the syndiotactic polystyrene, and the content of the polyphenylene ether resin in the material for liquid keeping containers is 1–200 parts by weight, more preferably 5–100 parts by weight, further preferably 10–100 parts by weight based on 100 parts by weight of the content of the syndiotactic polystyrene resin.

Inorganic fillers can be added to the composition of the present invention. Amount of the inorganic fillers when added is preferably 10–200 parts by weight based on 100 parts by weight of the resin composition. If the amount is less than 10 parts by weight, increase of mechanical strength is insufficient, and if it exceeds 200 parts by weight, moldability is deteriorated and appearance of molded products is damaged. The inorganic fillers are preferably glass fibers, carbon fibers, glass beads, talc, kaolin, etc. The glass fibers are preferably those of 15 $\mu$m or less in fiber diameter, and talc and kaolin are preferably those of 10 $\mu$m or less in particle diameter. If the fiber diameter and the particle diameter are too great, the reinforcing effect cannot be developed. Furthermore, in the case of adding inorganic fillers, one or more of the polypropylene resin, the thermoplastic elastomer and the polyphenylene ether resin can be those of which 0.1–100% is modified with maleic anhydride.

The material for liquid keeping containers of the present invention can be molded into liquid keeping containers by usual blow molding and the like. In this case, the heat resistance can also be improved by subjecting the molded products to a treatment at a temperature of not higher than the melting point, namely, to annealing treatment.

Figure 1B:
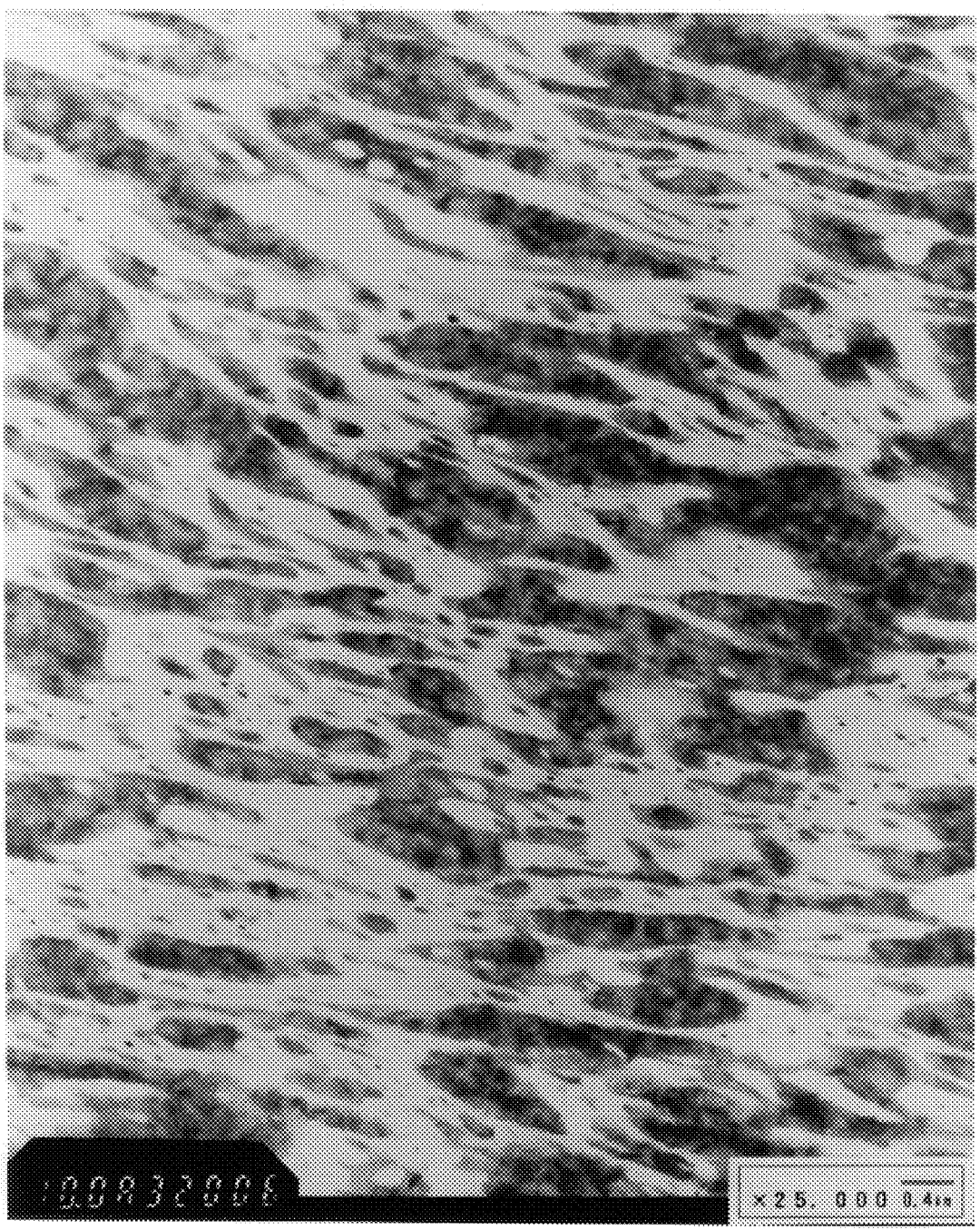

FIGS. 1A and 1B are electron micrographs showing one example of morphology of the molded products comprising the material for liquid keeping containers according to the present invention. These electron micrographs were prepared in the following manner. A composition which was the same in resin composition as of Example 1, but contained no glass fibers (GF) was prepared and this was molded into a dumbbell as in Example 1. The central portion of this molded product was cut out and observed by an electron microscope. The observation was conducted on the sample containing no glass fibers because it is difficult to see the morphology of a resin in an electron micrograph of a sample containing glass fibers. Basically, both the resin containing glass fibers and the resin containing no glass fibers have the same morphology. As can be seen from FIGS. 1A and 1B, the molded product of Example 1 generally comprises the two phases of the syndiotactic polystyrene resin (SPS) phase (the black part) and the polypropylene resin (PP) phase (the white part). The hydrogenated styrene thermoplastic elastomer (SEBS) is present at the interface of them. The polyphenylene ether resin (PPE) is not clear in the electron micrographs, but it is presumed that PPE is probably present at the interface of the three resins.

The present invention will be explained in more detail by the following examples, which should not be construed as limiting the invention in any manner.

The test methods are shown below.
(1) Tensile Test:
The tensile test was conducted in accordance with ASTM D638.
(2) Test on Resistance to Anti-freezing Solution:
A 50% aqueous solution of anti-freezing solution mainly composed of ethylene glycol was heated to 130° C., and a test piece was dipped therein for a given time and then properties were measured.

The following are results of water vapor transmission test (ASTM-F1249) on films of 0.38–0.41 mm in thickness at 38° C. and 90% RH (the device used: MOCON PERMATRAN W-200).

| Sample | Thickness (mm) | WVTR (g/m² 24 hr) | Note |
|---|---|---|---|
| ① Polypropylene | 0.41 | 0.71 | |
| ② Syndiotactic polystyrene (SPS) | 0.40 | 11.20 | |
| ③ Nylon 6,6 | 0.39 | 5.20 | |
| ④ SPS/PP/MPP/HTR/MHTR/PPE 45/23.7/1.3/19/1/10 | 0.38 | 2.22 | continuous phase SPS |
| ⑤ SPS/PP/MPP/HTR/MHTR/PPE 25/42.7/2.3/19/1/10 | 0.38 | 1.70 | continuous phase PP |

In the above table, WVTR means water vapor transmission coefficient.
(3) Calcium Chloride Resistance Test:
A strip-shaped test piece (⅛ inch) which was saturated with absorbed water was kept at bent state under a settled stress, and a 30 wt % aqueous calcium chloride solution was coated thereon. Then, this was left to stand in a hot-air dryer at 100° C. for 2 hours, and thereafter the surface state of the test piece was observed.

The symbol "−" indicates that there occurred no cracks, and "+", "++" and "+++" indicate that there occurred cracks, and with increase of the number of +, occurrence of cracks was greater.

EXAMPLES 1–8 AND COMPARATIVE EXAMPLES 1–3

The following resins were used and blended at the composition described in Table 1. The blend was melt kneaded and pelletized using a vented twin-screw extruder at a resin temperature of 280–300° C. The glass fibers were blended by adding at the intermediate position of the extruder. A test piece was prepared from the resulting composition using an injection molding machine at a resin temperature of 290° C. and a mold temperature of 110° C., and evaluation of properties was conducted. The results are shown in Table 1.
Resins Used:
(1) SPS (Syndiotactic Polystyrene):
This was produced in the following manner.
Production of the syndiotactic polystyrene.
A reactor KRC manufactured by Kurimoto Iron Works, Ltd. (internal volume: 8.6 L, blade diameter: 100 mm, effective length of cylinder: 1000 mm, the number of paddles: 44 sets, and clearance between the inner wall of the cylinder and the paddle: 1 mm) was tilted by 5°, the inner temperature was controlled to 80° C., and the number of revolution was set at 60 rpm. Polymerization was carried out for 5 hours with supplying to this reactor a styrene monomer at a rate of 1 L/hr and, simultaneously, methylaluminoxane at 75 mmol/hr and pentamethylcyclopentadienyltitanium trimethoxide at 0.15 mmol/hr as catalysts. The resulting styrene polymer having a syndiotactic structure was in an amount of 2950 g. The syndiotacticity of the polymer in racemic pentad was 97%. Number-average molecular weight of the syndiotactic polystyrene was 300,000.
(2) PP-1 (Polypropylene):
"SSA510B" manufactured by Japan Polyolefin Co., Ltd. having a crystallinity of 60%.
(3) PP-2 (Polypropylene):
"HCPP K5016" manufactured by Chisso Corporation having a crystallinity of 70%.

(4) MPP (Maleated Polypropylene):

"ER320P" manufactured by Japan Polyolefin Co., Ltd., an adduct with 0.2 part of maleic anhydride.

(5) HTR (Hydrogenated Styrene Elastomer):

"TUFTEC H1081" (trademark) manufactured by Asahi Kasei Kogyo K.K. containing 60% of styrene.

(6) MHTR (Maleated Hydrogenated Styrene Elastomer):

"TUFTEC M1913) (trademark) manufactured by Asahi Kasei Kogyo K.K.

(7) EG (Olefin Thermoplastic Elastomer):

"ENGAGE 8100" (trademark) manufactured by Dow Chemical Co. (ethylene/octene-1 copolymer, content of octene: 24% by weight).

(8) PPE (Polyphenylene Ether):

Powder manufactured by Asahi Kasei Kogyo K.K. $\eta SP/C=0.5$ (chloroform).

(9) MPPE (Maleated PPE):

"R4919" manufactured by Asahi Kasei Kogyo K.K., an adduct with 0.5 part of maleic anhydride.

(10) GF (Glass Fibers):

"ECS03T-480" manufactured by Japan Electric Glass Co., Ltd., a product treated with aminosilane.

EXAMPLE 9

Pelletization and molding were carried out in the same manner as in Example 1, except that PP-2 (crystallinity 70%) was used as the polypropylene in place of PP-1 (crystallinity 60%), and properties of the product were evaluated. The results are shown in Table 1. HDT was 128° C. when PP-2 of the high crystallinity was used (Example 9), and HDT was 114° C. when the usual PP-1 was used (Example 1). The heat resistance was improved by using the polypropylene resin of high crystallinity. Furthermore, the sample was subjected to annealing treatment at 150° C. for 10 minutes in a hot-air dryer, and, as a result, HDT was 150° C. when PP-2 of the high crystallinity was used (Example 9), and HDT was 142° C. when the usual PP-1 was used (Example 1).

TABLE 1

| | Example 1 | Example 2 | Example 3 | Example 4 | Comparative Example 1 | Comparative Example 2 | Comparative Example 3 | Example 5 | Example 6 | Example 7 | Example 8 | Example 9 |
|---|---|---|---|---|---|---|---|---|---|---|---|---|
| Composition of resin | | | | | | | | | | | | |
| SPS | 25.0(36.9) | 45.0(65.5) | 14.0(20.0) | 56.0(80.0) | 64.8(92.5) | 5.2(7.5) | Nylon 6,6 | 20.0(33.3) | 25.0(36.9) | 25.0(35.7) | 25.0(35.7) | 25.0(36.9) |
| PP-1 | 42.7(63.1) | 23.7(34.5) | 56.0(80.0) | 14.0(20.0) | 5.2(7.5) | 64.8(92.5) | | 40.0(66.7) | 42.7(63.1) | 45.0(64.3) | 45.0(64.3) | — |
| PP-2 | — | — | — | — | — | — | | — | — | — | — | 42.7(63.1) |
| MPP | 2.3(3.4) | 1.3(1.9) | — | — | — | — | | — | 2.3(3.4) | 5.0(7.1) | 5.0(7.1) | 2.3(3.4) |
| HTR | 19.0(28.1) | 19.0(27.7) | 19.0(27.1) | 19.0(27.1) | 19.0(27.1) | 19.0(27.1) | | 10.0(16.7) | 9.0(13.3) | 15.0(21.4) | 15.0(21.4) | 19.0(28.1) |
| MHTR | 1.0(1.5) | 1.0(1.5) | 1.0(1.4) | 1.0(1.4) | 1.0(1.4) | 1.0(1.4) | | 5.0(8.3) | 1.0(1.5) | 5.0(7.1) | 5.0(7.1) | 1.0(1.5) |
| EG | — | — | — | — | — | — | | 5.0(8.3) | — | — | — | — |
| PPE | 9.5(14.0) | 9.5(13.8) | 10.0(14.3) | 10.0(14.3) | 10.0(14.3) | 10.0(14.3) | | 10.0(16.7) | 9.5(14.0) | 5.0(7.1) | 5.0(7.1) | 9.5(14.0) |
| MPPE | 0.5(0.7) | 0.5(0.7) | — | — | — | — | | 10.0(16.7) | 0.5(0.7) | — | — | 0.5(0.7) |
| Resin/GF | 70/30 | 70/30 | 70/30 | 70/30 | 70/30 | 70/30 | 70/30 | 70/30 | 70/30 | 80/20 | 60/40 | 70/30 |
| Tensile strength (Yield) TY (Kg/cm$^2$) | 900 | 800 | 880 | 690 | 570 | 920 | 1680 | 800 | 920 | 650 | 920 | 1060 |
| Flexial modulus FM (Kg/cm$^2$) | 79000 | 78000 | 68000 | 76000 | 72000 | 42000 | 73000 | 79000 | 78000 | 65000 | 100000 | 82000 |
| IZOD (Kg.cm/cm) | 19.0 | 6.0 | 18.2 | 5.3 | 3.8 | 18.5 | 7.6 | 11.2 | 10.8 | 9.2 | 8.2 | 13.7 |
| Properties after dipping in coolant | | | | | | | | | | | | |
| 100 hr | | | | | | | | | | | | |
| TY (Kg/cm$^2$) | 890 | 680 | 860 | 860 | — | — | 880 | 800 | 910 | 650 | 920 | 1030 |
| FM (Kg/cm$^2$) | 77000 | 63000 | 68000 | 73000 | — | — | 52000 | 80000 | 77000 | 63000 | 98000 | 80000 |
| IZOD (Kg.cm/cm) | 20.1 | 4.5 | 17.8 | 4.9 | — | — | 7.6 | 10.5 | 10.7 | 8.9 | 8.2 | 13.0 |
| 300 hr | | | | | | | | | | | | |
| TY (Kg/cm$^2$) | 900 | 650 | 870 | 670 | — | — | 730 | 790 | 920 | 630 | 900 | 1020 |
| FM (Kg/cm$^2$) | 76000 | 61000 | 67000 | 73000 | — | — | 50000 | 77000 | 76000 | 63000 | 97000 | 79000 |
| IZOD (Kg.cm/cm) | 18.5 | 4.2 | 17.5 | 5.0 | — | — | 5.8 | 10.2 | 10.9 | 8.7 | 8.0 | 13.1 |
| 500 hr | | | | | | | | | | | | |
| TY (Kg/cm$^2$) | 880 | 660 | 870 | 670 | — | — | 630 | 780 | 900 | 630 | 880 | 1020 |
| FM (Kg/cm$^2$) | 77000 | 60000 | 66000 | 72000 | — | — | 49000 | 76000 | 76000 | 63000 | 97000 | 81000 |
| IZOD (Kg.cm/cm) | 19.2 | 4.2 | 16.8 | 4.8 | — | — | 4.8 | 9.9 | 10.8 | 8.7 | 8.0 | 13.2 |
| Water vapor transmission (g/cm$^2$ 24 hr) | 1.70 | 2.22 | 1.02 | 3.60 | 7.50 | 0.82 | 5.20 | 1.20 | 1.71 | 1.35 | 1.01 | 1.71 |
| Calcium chloride resistance test | — | — | — | — | — | — | +++ | — | — | — | — | — |

Industrial Applicability

The liquid keeping containers obtained by molding the material for liquid keeping containers of the present invention are excellent in water vapor transmission resistance, undergo substantially no deterioration in properties even when they contact with anti-freezing solution at high temperatures for a long time, and are excellent in chemical resistance, heat resistance and mechanical strength. The material of the present invention can be used for automobile parts of anti-freeze system, battery cases for secondary batteries, industrial piping, etc.

What is claimed is:

1. A liquid keeping container comprising a molded product of a material comprising a resin composition, wherein the resin composition comprises a syndiotactic polystyrene resin and a polypropylene resin and has a compatibilized structure of the syndiotactic polystyrene resin phase and the polypropylene resin phase, the proportion of these phases being 90-10/10-90 (weight ratio); and wherein the container is a part of an automobile anti-freeze system.

2. The liquid keeping container according to a claim 1, wherein the polypropylene resin is a continuous phase and the sydniotactic polystyrene resin is a disperse phase in the compatibilized structure.

3. The liquid keeping container according to claim 1, wherein the polypropylene resin is a disperse phase and the syndiotactic polystyrene resin is a continuous phase in the compatibilized structure.

4. The liquid keeping container according to claim 1, wherein the resin composition further comprises a thermoplastic elastomer in an amount of 1–200 parts by weight based on 100 parts by weight of the syndiotactic polystyrene resin.

5. The liquid keeping container according to claim 4, wherein the thermoplastic elastomer is a styrene thermoplastic elastomer or an olefin thermoplastic elastomer, or a combination of a styrene thermoplastic elastomer and an olefin thermoplastic elastomer.

6. The liquid keeping container according to claim 1, wherein 0.1–100% by weight of the polypropylene resin is modified with maleic anhydride.

7. The liquid keeping container according to claim 1, wherein the resin composition further comprises a polyphenylene ether resin in an amount of 1–200 parts by weight based on 100 parts by weight of the syndiotactic polystyrene resin.

8. The liquid keeping container according to claim 7, wherein 0.1–100 parts by weight of the polyphenylene ether is modified with maleic anhydride.

9. The liquid keeping container according to claim 1, wherein the resin compostion comprises:

(A) 10–90% by weight of the syndiotactic polystyrene resin, (B) 10–90% bty weight of the polypropylene resin, (C) 1–200 parts by weight of a themoplastic elastomer base on 100 parts by weight of the above component (A), and (D) 1–200 parts by weight of a polyphenylene ether resin based on 100 parts by weight of the component (A).

10. The liquid keeping container according to claim 1, further comprising an inorganic filter.

11. The liquid keeping container according to claim 10, wherein the inorganic filter comprises a glass filter.

12. The liquid keeping container according to claim 4, wherein 0.1–100% by weight of the themoplastic elastomer is modified with maleic anyhydride.

13. The liquid keeping container according to claim 9, wherein 0.1–100% by weight of the themoplastic elastomer is modified with maleic anhydride.

14. The liquid keeping container according to claim 9, wherein the resin compostion further comprises 10–200 parts by weight of an inorganic filler based on 100 parts by weight of (A), (B), (C) and (D).

15. The liquid keeping container according to claim 14, wherein the inorganic filler comprises a glass fiber.

* * * * *